(12) United States Patent
Schreck et al.

(10) Patent No.: US 7,227,717 B1
(45) Date of Patent: Jun. 5, 2007

(54) ASYMMETRIC DISK SURFACE PROPERTIES IN ONE HEAD DISK DRIVES

(75) Inventors: Erhard Schreck, San Jose, CA (US); Yanning Liu, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 352 days.

(21) Appl. No.: 10/056,295

(22) Filed: Jan. 23, 2002

Related U.S. Application Data

(60) Provisional application No. 60/298,969, filed on Jun. 18, 2001.

(51) Int. Cl.
*G11B 5/82* (2006.01)
*G11B 5/84* (2006.01)

(52) U.S. Cl. .................... 360/97.01; 360/135
(58) Field of Classification Search ............. 360/135, 360/97.01, 97.02, 97.04, 97.03; 369/286, 369/289, 280, 272, 273; 428/64.1, 64.2, 428/65.3, 694 TS
See application file for complete search history.

(56) References Cited

U.S. PATENT DOCUMENTS

| | | | | |
|---|---|---|---|---|
| 3,516,860 | A | * | 6/1970 | Simmons .................... 427/129 |
| 3,646,533 | A | * | 2/1972 | Rosenblum ................. 360/135 |
| 3,843,188 | A | * | 10/1974 | Kirschner ...................... 295/7 |
| 4,376,963 | A | * | 3/1983 | Knoop et al. ............... 360/135 |
| 4,415,942 | A | * | 11/1983 | Frosch et al. ............... 360/135 |
| 4,547,425 | A | * | 10/1985 | Naruse ........................ 428/328 |
| 4,622,661 | A | * | 11/1986 | Hoogeveen et al. ........ 369/280 |
| 4,800,458 | A | * | 1/1989 | Okita ........................ 360/135 |
| 4,816,939 | A | * | 3/1989 | Ford et al. ................ 360/77.03 |
| 4,961,123 | A | * | 10/1990 | Williams et al. ............ 360/131 |
| 4,971,932 | A | * | 11/1990 | Alpha et al. .................... 501/3 |

(Continued)

FOREIGN PATENT DOCUMENTS

EP 704843 A1 * 4/1996

(Continued)

OTHER PUBLICATIONS

"Flexible Magnetic Disk Stabilizer," Nov. 1977, IBM TDB, vol. No. 20, Iss. No. 6, pp. 2380-2381.*

(Continued)

*Primary Examiner*—William J. Klimowicz
(74) *Attorney, Agent, or Firm*—James P. Broder; Steven G. Roeder

(57) ABSTRACT

A disk drive for storing data includes a drive housing and an asymmetrical storage disk. The storage disk includes a body region, a first side region, and an opposed second side region. The side regions are asymmetrical relative to the body region. Various structures can be, alternately or in combination, incorporated into the second side region. For example, the second side region can include one or more stiffeners that increase the rigidity of the storage disk, a plurality of projections that improve fluid flow within the disk drive, a damping layer for damping vibration of the storage disk, and/or a constraining layer that enhances the damping properties of the damping layer. In other embodiments, the second side region includes a supplemental layer that balances the storage disk, an adsorption layer that adsorbs impurities, and/or a diffusion layer that filters unwanted particles.

58 Claims, 11 Drawing Sheets

U.S. PATENT DOCUMENTS

| | | | | |
|---|---|---|---|---|
| 5,061,537 | A | * | 10/1991 | Kobayashi et al. ...... 428/848.4 |
| 5,245,601 | A | * | 9/1993 | Hake ..................... 369/72 |
| 5,249,093 | A | * | 9/1993 | Umekida et al. ........... 360/135 |
| 5,476,700 | A | * | 12/1995 | Asai et al. ................. 428/66.6 |
| 5,487,926 | A | * | 1/1996 | Kuribayashi et al. ......... 428/33 |
| 5,538,774 | A | * | 7/1996 | Landin et al. .............. 428/64.1 |
| 5,590,009 | A | * | 12/1996 | Ishida ....................... 360/135 |
| 5,626,941 | A | * | 5/1997 | Ouano ........................ 428/141 |
| 5,725,931 | A | * | 3/1998 | Landin et al. .............. 428/134 |
| 5,895,696 | A | * | 4/1999 | Stanish et al. ............. 428/64.1 |
| 5,930,073 | A | * | 7/1999 | Tanaka et al. ........... 360/97.02 |
| 5,948,495 | A | * | 9/1999 | Stanish et al. ............. 428/64.1 |
| 5,981,018 | A |   | 11/1999 | Lai et al. |
| 6,055,140 | A | * | 4/2000 | Marchon .................... 360/135 |
| 6,125,099 | A | * | 9/2000 | Boutaghou et al. ......... 720/719 |
| 6,141,316 | A | * | 10/2000 | Simpson .................... 369/286 |
| 6,335,080 | B1 | * | 1/2002 | Weiss et al. ................ 428/141 |
| 6,510,125 | B1 | * | 1/2003 | Shigetomi et al. .......... 369/273 |
| 6,850,391 | B1 | * | 2/2005 | Marchon .................... 360/135 |

FOREIGN PATENT DOCUMENTS

| | | | | |
|---|---|---|---|---|
| EP |       1113437 | A1 | * | 7/2001 |
| JP |      59033626 | A | * | 2/1984 |
| JP |      62175990 | A | * | 8/1987 |
| JP |      63251924 | A | * | 10/1988 |
| JP |      01073528 | A | * | 3/1989 |
| JP |      01302530 | A | * | 12/1989 |
| JP |      03176809 | A | * | 7/1991 |
| JP |      04146522 | A | * | 5/1992 |
| JP |      04291037 | A | * | 10/1992 |
| JP |      04325979 | A | * | 11/1992 |
| JP |      04368623 | A | * | 12/1992 |
| JP |      05334666 | A | * | 12/1993 |
| JP |      05334667 | A | * | 12/1993 |
| JP |      06103563 | A | * | 4/1994 |
| JP |      08255316 | A | * | 10/1996 |
| JP |      10049864 | A | * | 2/1998 |
| JP |      10124843 | A | * | 5/1998 |
| JP |      10146843 | A | * | 6/1998 |
| JP |      10188343 | A | * | 7/1998 |
| JP |      10208297 | A | * | 8/1998 |
| JP |      10269569 | A | * | 10/1998 |
| JP |      10308021 | A | * | 11/1998 |
| JP |      10320767 | A | * | 12/1998 |
| JP |      11120546 | A | * | 4/1999 |
| JP |      11161944 | A | * | 6/1999 |
| JP |      11191216 | A | * | 7/1999 |
| JP |      11306594 | A | * | 11/1999 |
| JP |    2000040226 | A | * | 2/2000 |
| JP |    2000090432 | A | * | 3/2000 |
| JP |    2000306236 | A | * | 11/2000 |
| JP |    2001034929 | A | * | 2/2001 |
| JP |    2004030807 | A | * | 1/2004 |
| WO | WO 9905672 | A1 | * | 2/1999 |

OTHER PUBLICATIONS

"Flexible Magnetic Disk Stabilizer," Nov. 1977, IBM TDB, vol. No. 20, Iss. No. 6, pp. 2378-2379.*

"Air Filtration System for a Small Rigid File," Mar. 1, 1986, IBM TDB, vol. No. 28, Iss. No. 10, pp. 4473-4474.*

* cited by examiner

ASYMMETRIC DISK SURFACE PROPERTIES IN ONE HEAD DISK DRIVES

RELATED APPLICATION

This application claims the benefit on U.S. Provisional Application Ser. No. 60/298,969, filed on Jun. 18, 2001. The contents of U.S. Provisional Application Ser. No. 60/298,969 are incorporated herein by reference.

FIELD OF THE INVENTION

The present invention relates generally to disk drives for storing data. More specifically, the present invention relates to a storage disk of a disk drive.

BACKGROUND

Disk drives are widely used in computers and data processing systems for storing information in digital form. A typical disk drive includes an actuator motor, an E-block, one or more storage disks and one or more head suspension assemblies. The actuator motor moves the E-block relative to the storage disks. The E-block includes one or more actuator arms for positioning the one or more head suspension assemblies. Each head suspension assembly includes a slider and a read/write head.

Each storage disk typically includes a data storage surface on each side of the storage disk. The data storage surfaces are divided into a plurality of tracks. FIG. 1 is a cross-sectional view of an example of a portion of a prior art storage disk 18P. The storage disk 18P illustrated in FIG. 1 is formed beginning with a body region 58P made from an aluminum alloy. Layers of differing materials having varying thicknesses are symmetrically built up onto both sides of the body region 58P using plating or sputter depositing.

For example, moving outward from the body region 58P, the next layer can be a sublayer 70P made from a nickel alloy. The subsequent layer can be an underlayer 72P formed from a chromium alloy. Further, a magnetic layer 74P, an overcoat layer 76P and a lubricating layer 78P can be added to each side of the storage disk 18P. These layers usually vary in thickness from layer to layer. However, from one side of the storage disk 18P to the other, the thickness of each layer is substantially identical.

Recently, disk drives are being manufactured which utilize a single storage disk having only one data storage surface and one head suspension assembly ("one head disk drives"). These disk drives offer various advantages over disk drives having multiple storage surfaces, including a decreased complexity, i.e. requiring fewer mechanical and electrical components. For example, one head disk drives do not necessarily require the use of an E-block because only one actuator arm is needed to support the one head suspension assembly. As a consequence, the relative simplicity of one head disk drives can yield fewer reading and writing errors, resulting in increased accuracy and performance. Further, one head disk drives are typically more robust, easier to assemble, more physically compact and less costly to manufacture.

Moreover, the need to reduce data access times has led to increasing the rotational speed of the one or more storage disks. Because of the increased speed, the rotating storage disk(s) can generate significant air turbulence within the disk drive. Increased air turbulence can lead to unwanted vibration of the storage disk(s), and can effectively magnify any slight imbalance or other imperfections in the storage disk(s). For example, air turbulence can generate regions of low pressure near the storage disk(s), which are then filled by air rushing in because of the pressure differential. This repeated cycle causes chaotic and random flutter or wobble of the storage disk(s), making accurate track following more difficult.

Additionally, flutter or wobble of the storage disk can cause unwanted contact with the slider, resulting in damage to the head suspension assembly, damage to the storage disk and/or the loss of data. Moreover, vibration of the storage disk can result in acoustical problems, which in applications such as digital video cameras, for example, can lower the ultimate sound recording quality.

In addition, in order to increase storage capacity, storage disks are being manufactured with increased track density, i.e. more tracks per inch. In conventional disk drives, each slider rides on an air bearing generated by rotation of the storage disk. The separation between the slider and the disk surface during rotation of the storage disk is referred to as the flying height. As track density increases, the flying height must necessarily decrease in order to maintain accuracy of the disk drive. Currently, flying heights can be 20 nanometers or less. A drawback of such low flying heights is that even slight vibration or imbalance of the storage disk can cause the slider to crash into the storage disk.

In light of the above, the need exists to provide a reliable, simple, and efficient disk drive. Another need exists to provide a storage disk that inhibits track misregistration, inhibits vibration, and/or reduces the amount of fluid turbulence around the storage disk. Yet another need exists to provide a disk drive utilizing a single storage disk, which is relatively easy and cost effective to manufacture, assemble and use.

SUMMARY

The present invention is directed to an asymmetrical storage disk for a disk drive. The storage disk includes a body region, a first side region secured to the body region, and an opposed second side region secured to the body region. The side regions are asymmetric relative to the body region.

In one embodiment, the first side region is adapted to store data, and the second side region is not adapted to store data. In this embodiment, for example, (i) the first side region includes one or more servo sectors, and the second side region does not include any servo sectors, and/or (ii) the first side region includes a magnetic layer, and the second side region does not include a magnetic layer. In a further embodiment, the first side region includes a first layer and the second side region includes a second layer that is made from a different material than the first layer. In another embodiment, the second side region has a mass, thickness and/or density that is different than a mass, thickness and/or density of the first side region.

Additional embodiments of the storage disk incorporate one or more stiffeners into the second side region of the storage disk. The stiffeners can be positioned and sized to increase rigidity of the storage disk. The stiffeners can be radial, tubular, arc-shaped, or can be configured in other suitable shapes. In yet another embodiment, the second side region can include a plurality of projections. In still another embodiment, the second side region can include a supplemental layer that improves the balance of the storage disk during disk rotation. The supplemental layer can have a non-uniform thickness.

In yet another embodiment, the second side region includes a damping layer that reduces the vibration of the storage disk. Additionally, a constraining layer can be incorporated into the second side region adjacent to the damping layer.

In still another embodiment, the second side region includes an adsorption layer that absorbs dust, debris and volatiles. In this embodiment, the second side region can also include a diffusion layer that is positioned adjacent to the adsorption layer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The present invention provides a method and apparatus for decreasing vibration and imbalance of a storage disk for use in a disk drive. The present invention is particularly suited to one head disk drives having a single storage disk.

Figure 1:
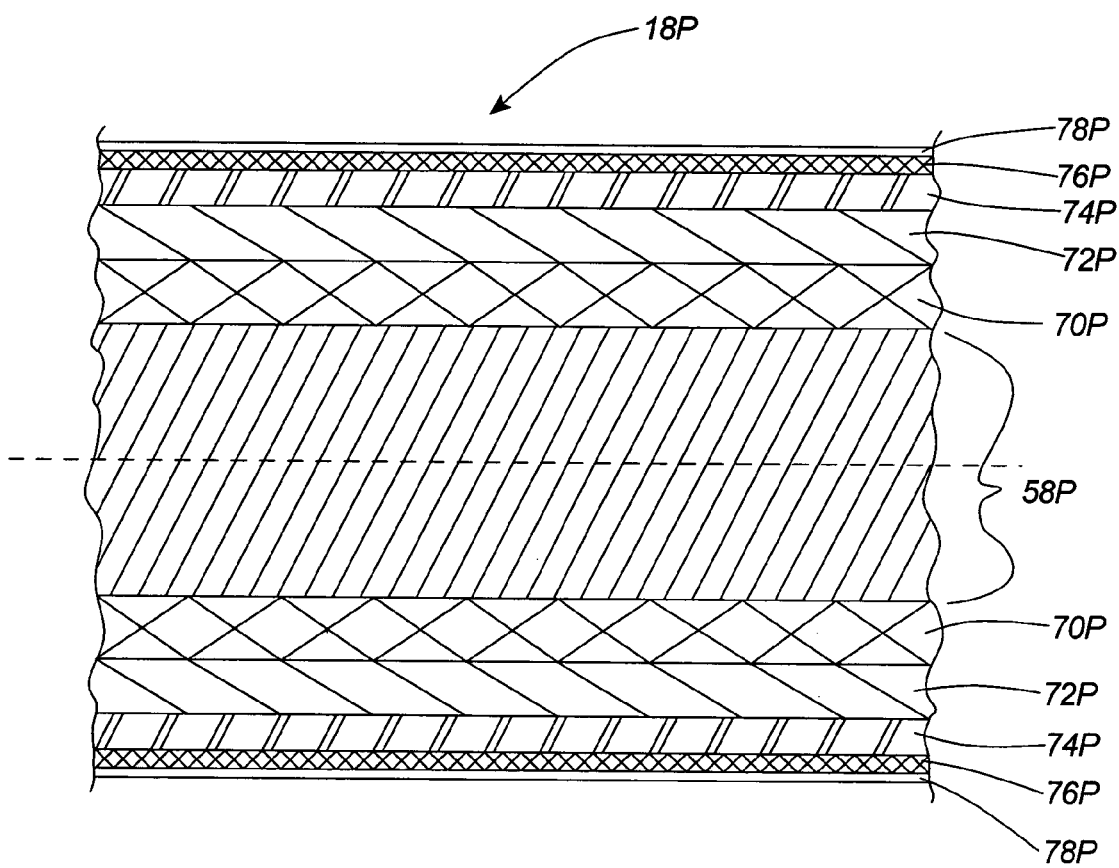
FIG. 1 is a cross-sectional view of a portion of a prior art storage disk.
Figure 2A:
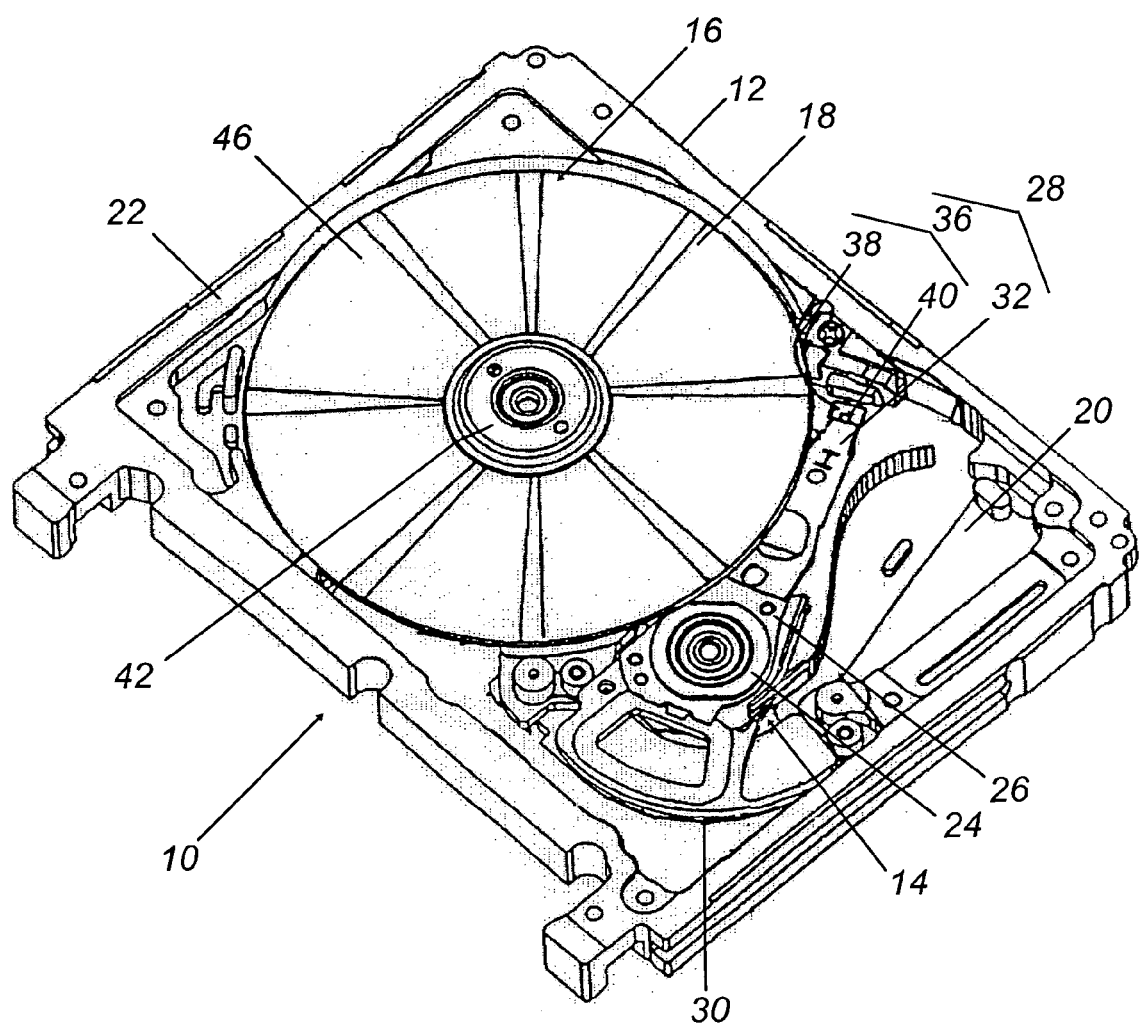
FIG. 2A is a simplified perspective view of a disk drive having features of the present invention.

Referring initially to FIG. 2A, the disk drive 10 includes (i) a drive housing 12, (ii) a head stack assembly 14, and (iii) a disk assembly 16 having a storage disk 18. The drive housing 12 retains the various components of the disk drive 10. The drive housing 12 includes a housing base 20, four side walls 22, and a housing cover (not shown in FIG. 2A for clarity).

The head stack assembly 14 illustrated in FIG. 2A includes an actuator hub 24, an actuator arm 26, a head suspension assembly 28 and an actuator motor 30. The actuator motor 30 rotates the actuator hub 24 and the head suspension assembly 28 relative to the storage disk 18. Only a portion of the actuator motor 30 is illustrated in FIG. 2A. The head suspension assembly 28 includes a load beam 32, a flexure (not shown) and a slider assembly 36. The load beam 32 is secured to the actuator arm 26, and supports the slider assembly 36 proximate one side of the storage disk 18. The slider assembly 36 includes a slider 38 and a read/write head 40 that transfers information to and from the storage disk 18.

The disk assembly 16 includes a disk spindle 42 and the storage disk 18. The disk spindle 42 is rotatably mounted to the drive housing 12. The storage disk 18 is fixedly secured to the disk spindle 42. The disk spindle 42 and the storage disk 18 are adapted to rotate at a predetermined angular velocity.

The storage disk 18 is generally disk shaped and stores data in a form that can be subsequently retrieved if necessary. The storage disk 18 includes a first side surface 44 (illustrated in FIG. 2B) and an opposed second side surface 46. In FIG. 2A, the second side surface 46 is facing upward. Alternately, for example, the second side surface 46 could be facing downward. In FIG. 2A, during operation of the disk drive 10, the read/write head 40 is positioned over the first side surface 44 by the actuator motor 30.

The storage disk 18 is particularly suited to be a magnetic storage disk. Moreover, the materials utilized in the storage disk 18 can include metals, ceramics, glass, plastics, other suitable materials, or combinations of these materials. In addition, the diameter of the storage disk 18 can vary. For instance, the storage disk 18 can have a diameter of approximately one inch, two and one half inches, three and one half inches, or any other suitable diameter depending upon the design requirements of the disk drive 10.

The disk drive 10 illustrated in FIG. 2A also includes a ramp 47 that supports the slider 38 away from the storage disk 18 during non-rotation of the storage disk 18.

In FIG. 2A, the second side surface 46 generally faces away from the read/write head 40 during reading and/or writing operations. Thus, the second side surface 46 can be used for other purposes than storing data. For example, as provided in detail below, the second side surface 46 can be used for increasing rigidity, controlling airflow, damping vibration, decreasing imbalance, and/or filtering impurities. With these designs, the storage disk 18 is asymmetrical.

Figure 2B:
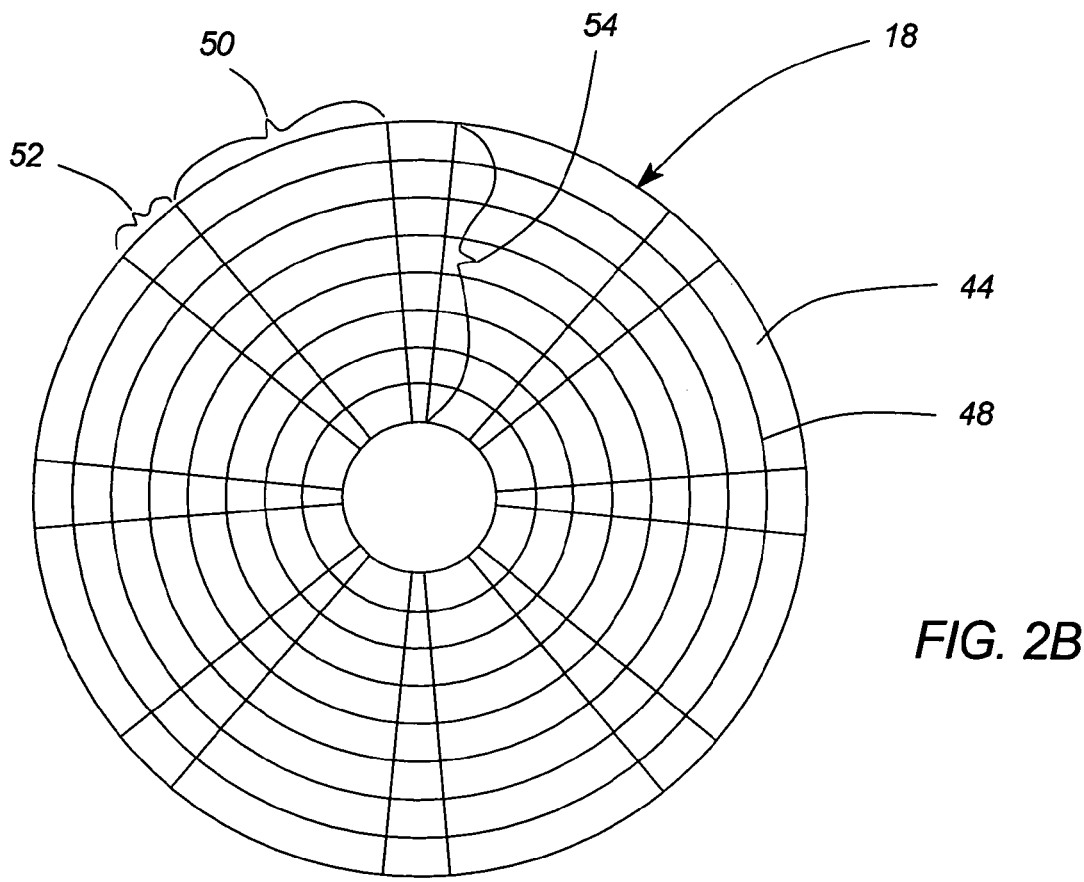
FIG. 2B is a bottom view of a storage disk having features of the present invention.

FIG. 2B illustrates a bottom plan view of the storage disk 18, including the first side surface 44. The first side surface 44 is substantially flat and includes a plurality of concentric tracks 48 of different radii, each of which is adapted to store data. Although FIG. 2B only illustrates a relatively small number of tracks 48, the first side surface 44 can have many thousands of tracks 48. The first side surface 44 also includes a plurality of data sectors 50 and a plurality of servo sectors 52 in each track 48. Data from a host user can be written to, and retrieved from, the data sectors 50. It is recognized that inclusion of servo sectors 52 on the first side surface 44 of storage disk 18 can be implemented in various ways known to those skilled in the art.

The servo sectors 52 in each track 48 are radially aligned with servo sectors 52 in other tracks 48, thereby forming servo wedges 54 that extend radially across the storage disk 18. During a seek operation or a track following operation, the read/write head (not shown in FIG. 2B) samples the servo sector 52 each time it crosses over one. The read/write head then delivers positioning information to a servo controller (not shown). Consequently, the servo controller updates a control signal to the actuator motor (not shown on FIG. 2B) based on the current position of the read/write head relative to the desired track 48, causing the actuator motor to reposition the read/write head, if necessary.

Figure 2C:
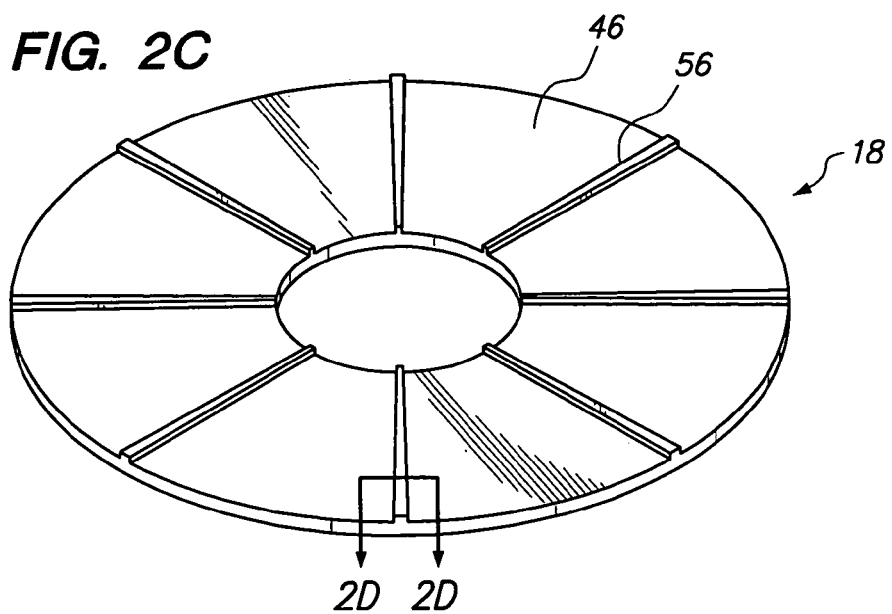
FIG. 2C is a perspective view of an embodiment of a storage disk having features of the present invention.

FIG. 2C illustrates a top perspective view of a first embodiment of the asymmetric storage disk 18. In this embodiment, the second side surface 46 includes one or more generally rigid, stiffeners 56 that extend substantially radially from the inner diameter towards the outer diameter of the storage disk 18. The stiffeners 56 provide additional structural stiffening and rigidity to the storage disk 18 and decrease the amplitude of vibration and wobble during rotation of the storage disk 18. This helps preserve the flatness of the first side surface of the storage disk 18. With this design, greater accuracy in the transfer of data to and from the storage disk 18 can be achieved.

Although FIG. 2C illustrates eight, radial stiffeners 56, any number of stiffeners 56 can be incorporated into the storage disk 18. Further, the dimensions of each stiffener 56 can vary depending upon the design requirements of the disk drive 10. For example, in FIG. 2C, the width of each stiffener 56 increases from the inner diameter to the outer diameter of the storage disk 18. Alternatively, the width of each stiffener 56 can be uniform, or can decrease from the inner diameter to the outer diameter. Moreover, the width and height of the stiffeners 56 can vary from stiffener 56 to stiffener 56. In FIG. 2C each stiffener 56 has a generally rectangular shape cross-section. Alternately, for example, each stiffener 56 could have a triangular shaped cross-section.

Additionally, the materials utilized for the stiffeners 56 and the exact placement of the stiffeners 56 can vary. For example, each stiffener 56 can be formed from materials that provide additional stiffening and which do not significantly interfere with the magnetic properties of the storage disk 18. For example, various aluminum alloys can be used to form the stiffeners 18, although any other suitable materials can likewise be utilized.

It should be noted in FIG. 2C, that the second side surface 46 is not adapted to store data and does not include data tracks, servo sectors or servo wedges.

Figure 2D:
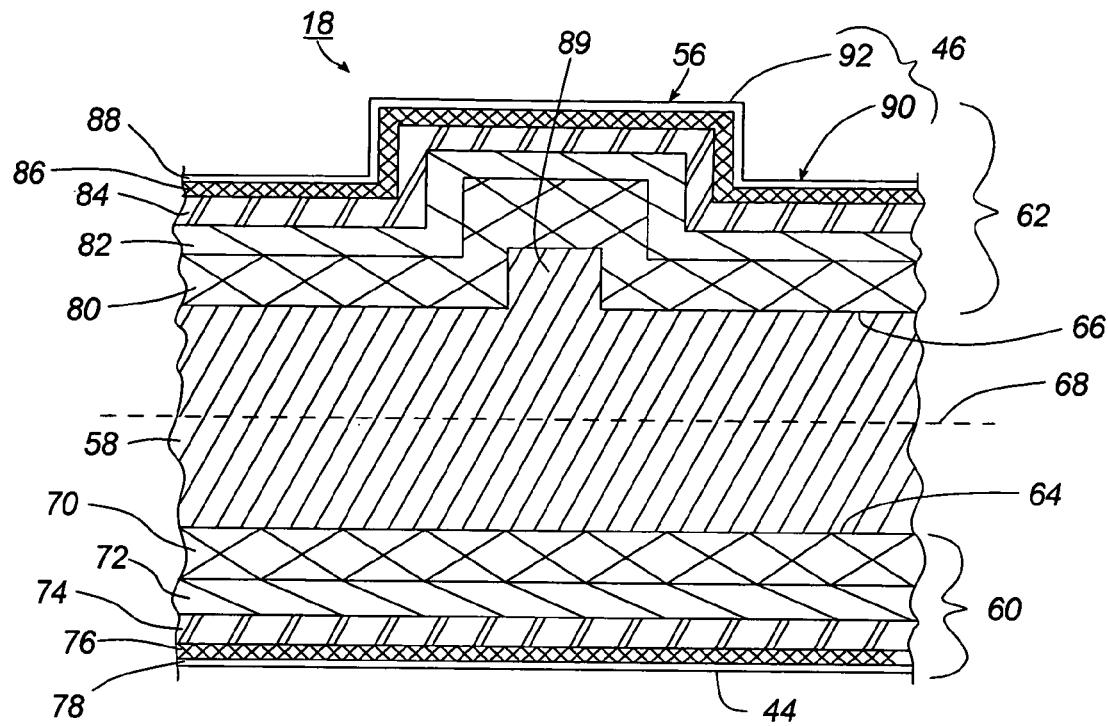
FIG. 2D is a partial cross-sectional view taken at line 2D—2D in FIG. 2C.

FIG. 2D illustrates a cut-away view of a portion of the storage disk 18 of FIG. 2C. As illustrated in FIG. 2D, the storage disk 18 includes a body region 58, a first side region 60, and a second side region 62. The design, thickness, and shape of each of the regions 58, 60, 62 can be varied pursuant to the teachings provided herein. It should be noted that because of the relative disparity between thicknesses of the different regions 58, 60, 62, the thicknesses of the different regions 58, 60, 62 in FIG. 2D are not to scale.

The body region 58 that supports the side regions 60, 62, is generally disk shaped, and includes a first body side 64 and an opposed second body side 66. A central disk plane 68 (shown in phantom) bisects the body region 58 intermediate the body sides 64, 66. The body sides 64, 66 are on opposite sides of the central disk plane 68 and are substantially parallel to the central disk plane 68. The body region 58 is generally rigid and can be formed from an aluminum magnesium alloy, for example, although other sufficiently rigid materials can be used. The thickness of the body region 58 can be between approximately 0.5 millimeters and 2.0 millimeters, although other thicknesses can be utilized.

The first side region 60 defines the first side surface 44 that is adapted to store data and includes one or more first layers. In FIG. 2D, the first side region 60 includes a first sublayer 70, a first underlayer 72, a first magnetic layer 74, a first overcoat layer 76 and a first lubricating layer 78 that are sequentially plated or sputter deposited onto the body region 58. The first side surface 44 can be burnished to minimize imperfections or variations.

The precise materials used and the thicknesses of each first layer can be varied to suit the requirements of the disk drive 10. For example, the first sublayer 70 can be formed from a nickel phosphorus material having a thickness of approximately 10,000 nanometers. The first underlayer 72 can be formed from a chromium alloy having a thickness of approximately 50 nanometers. The first magnetic layer 74 can include materials such as cobalt and chromium, and can have a thickness of approximately 25 nanometers. The first overcoat layer 76 can include a carbon-based material with a thickness of approximately 7.5 nanometers. The first lubricating layer 78 can have a thickness of approximately 1 nanometer. However, the first side region 60 need not include all of the layers specified above and/or the first side region 60 can include additional layers than those described above.

The second side region 62 defines the second side surface 46 and includes one or more second layers. In FIG. 2D, the second side region 62 includes a second sublayer 80, a second underlayer 82, a second magnetic layer 84, a second overcoat layer 86 and a second lubricating layer 88 that are sequentially plated or sputter deposited onto the body region 58.

The precise materials used and the thicknesses of each second layer can vary to suit the requirements of the disk drive 10. For example, the second sublayer 80 can be formed from a nickel phosphorus material having a thickness of approximately 10,000 nanometers. The second underlayer 82 can be formed from a chromium alloy having a thickness of approximately 50 nanometers. The second magnetic layer 84 can include materials such as cobalt and chromium, and can have a thickness of approximately 25 nanometers. The second overcoat layer 86 can include a carbon-based material with a thickness of approximately 7.5 nanometers. The second lubricating layer 88 can have a thickness of approximately 1 nanometer. However, the second side region 46 need not include all of the second layers specified above, and/or the second side region 46 can include additional layers than those described above.

It should be noted that in FIG. 2D, the number and thicknesses of first layers of the first side region 44 are substantially the same as the number and thicknesses of the second layers of the second side region 62. However, the number of first layers in the first side region 44 can be greater or less than the number of second layers in the second side region 62. For example, because the second side region 62 does not need to be adapted to store data, the second side region 62 can be designed to not include the second magnetic layer 84. Therefore, one or more of the second layers of the second side region 62 shown in FIG. 2D can be omitted, or substituted with a different material, with no detrimental effects to operation of the disk drive 10.

FIG. 2D illustrates that each stiffener 56 can be formed as an integral part of the body region 58. In this embodiment, each stiffener 56 is a beam 89 that extends upward from the second body side 66 and each stiffener 56 is made from the same material as the body region 58. Subsequently, the second layers are sequentially plated or sputter over the beam 89 and the body region 58.

Alternately, for example, each stiffener 56 can be a beam that is adhered to the body region 58, a beam secured to the top of the second side surface 46, or a beam positioned within the second layers of the second side region 62. Still alternately, material of sufficient strength can be added directly onto the second side surface 46 to form the stiffeners 56. In another embodiment, material can be removed from the second side surface 46 during the manufacturing process, effectively leaving material forming one or more the raised stiffeners 56 on the second side region 62.

The height of each stiffener 56 can vary. For example, each stiffener 56 can have a height of between approximately 0.001 millimeters and 2.0 millimeters. In FIG. 2D, because of the stiffeners 56, the second side surface 46 includes a plurality of outer flat sections 90 and a plurality of outer ridged sections 92 that extend above the outer flat sections 90. The ridged sections 92 can have any height that does not cause substantial interference with rotation of the storage disk 18, e.g., contact the drive housing (not shown on FIG. 2D). For example, each ridged section 92 can extend between approximately 0.001 millimeters and 2.0 millimeters away from the outer flat sections 90.

It should be noted from FIG. 2D, that the storage disk 18 is asymmetrical. Stated another way, the first side region 60 and the second side region 62 are not symmetrical relative to the body region 58 and the central disk plane 68.

As a result of the stiffeners 56, the increased rigidity of the second side region 62 maintains the first side surface 44 flatter, permitting lower flying heights without increasing the risk of contact between the slider and the storage disk 18. Decreased flying heights result in greater accuracy in the transfer of data to and from the storage disk 18. Further, maintaining a relatively constant distance between the read/write head and the first side surface 44 results in a more consistent signal strength, which decreases the potential for reading and writing errors. In addition, by varying the size, positioning and number of stiffeners 56, the storage disk 18 can be altered to achieve the desired level of stiffness to best suit the design requirements of the disk drive 10.

Figure 2E:
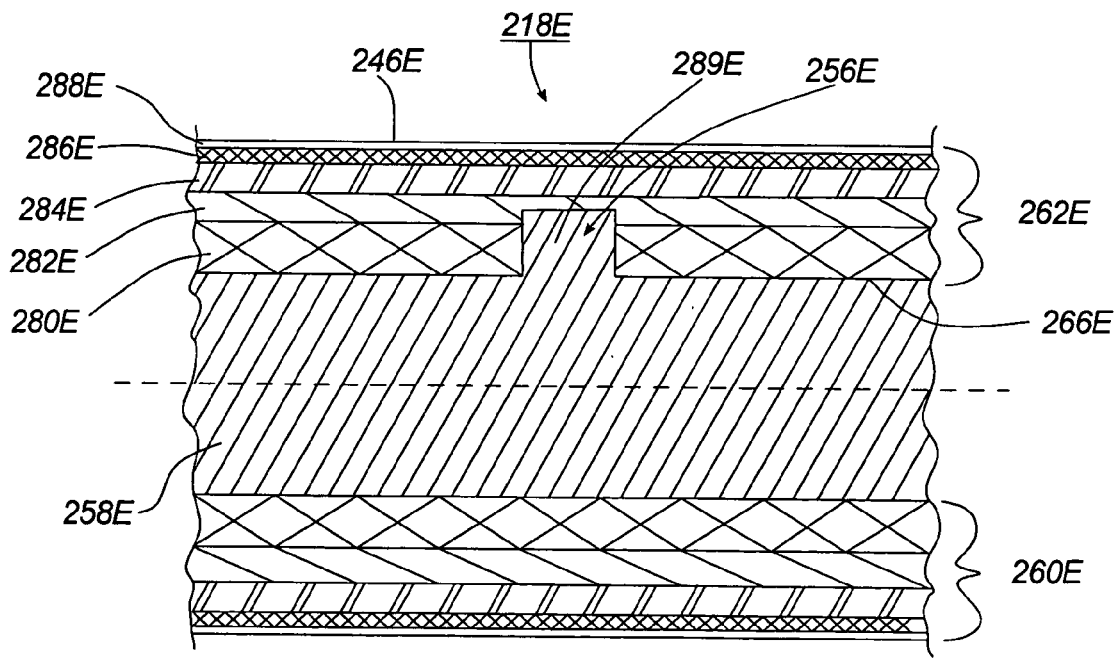
FIG. 2E is an alternate cross-sectional view of a portion of the storage disk.

FIG. 2E illustrates a cross-sectional view of another embodiment of the storage disk 218E. In this embodiment, the first side region 260E is similar to the first side region 60 described above. Further, each stiffener 256E is a beam 289E that is integrally formed and extends above the second body side 266E of the body region 258E. However, in FIG. 2E, one or more of the second layers 280E, 282E, 284E, 286E, 288E of the second side region 262E are not deposited over each beam 289E. As a result thereof, the second side surface 246E is substantially flat.

Figure 2F:
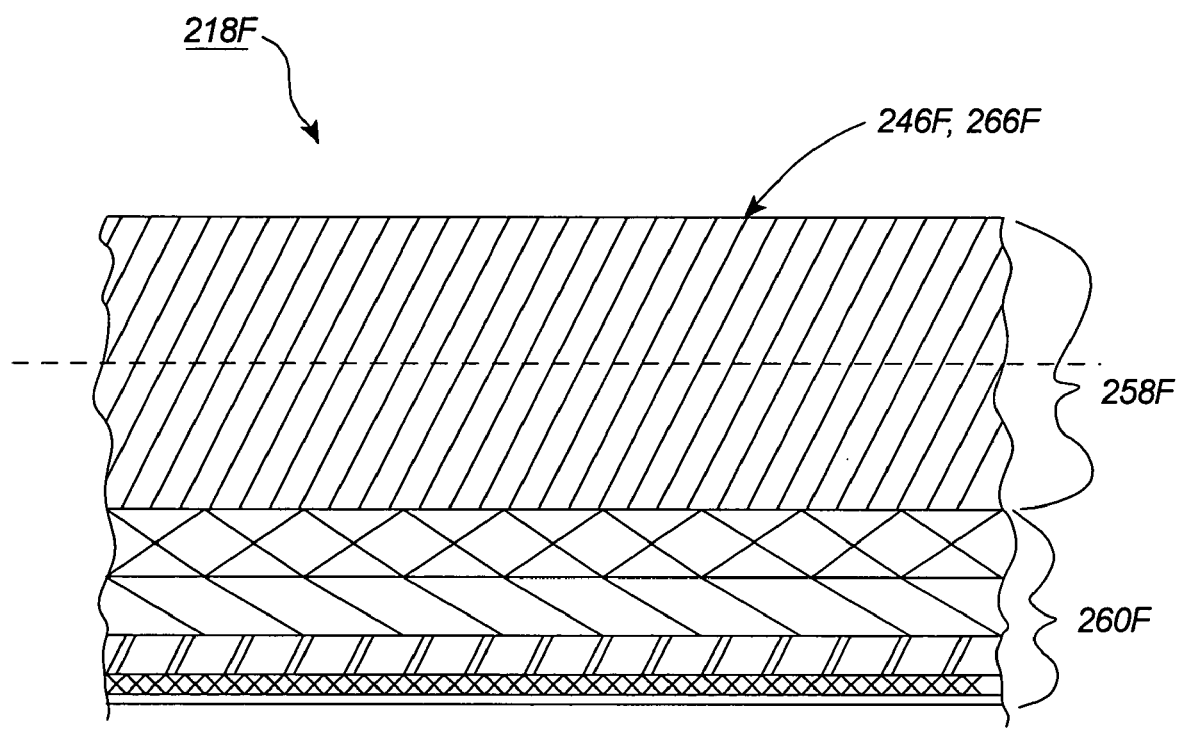
FIG. 2F is another cross-sectional view of a portion of the storage disk.

FIG. 2F illustrates a cross-sectional view of another embodiment of the storage disk 218F. In this embodiment, the first side region 260F is similar to the first side region 60 described previously. However, in this embodiment, there is no second side region. Stated another way, the second body side 266F of the body region 258F is exposed and is not covered with the second side region. In this design, the second body side 266F defines the second side surface 246F.

With this design, the storage disk 218F illustrated in FIG. 2F can be efficiently and cost-effectively manufactured, as described below.

Figure 2G:
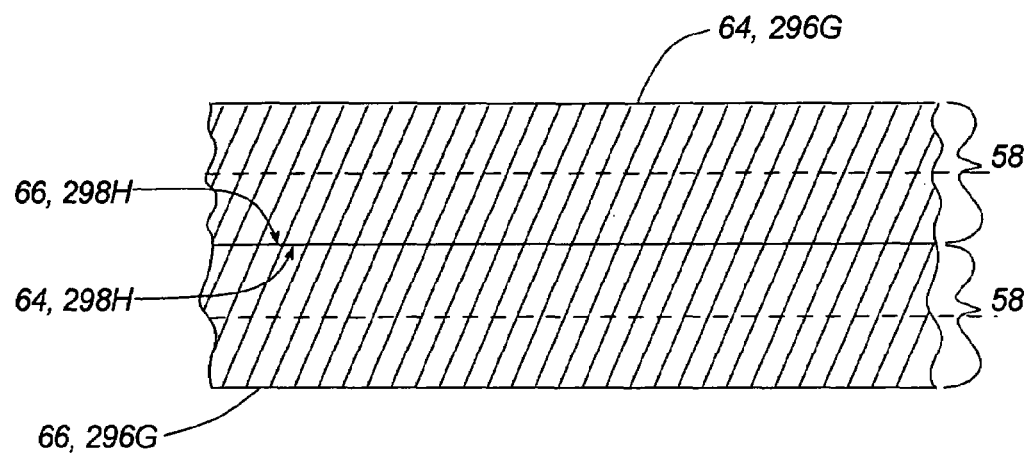
FIG. 2G illustrates a step in the manufacturing of the storage disk in FIG. 2F.

Referring to FIG. 2G, the process used to manufacture the storage disk 218F (shown in FIG. 2F) includes positioning two body regions 58 so that one of the body sides 64, 66 of one of the body regions 58 is adjacent to and abuts against one of the body sides 64, 66 of the other body region 58. In this manner, each body region 58 will have an exposed body side 296G and a hidden body side 298H.

Figure 2H:
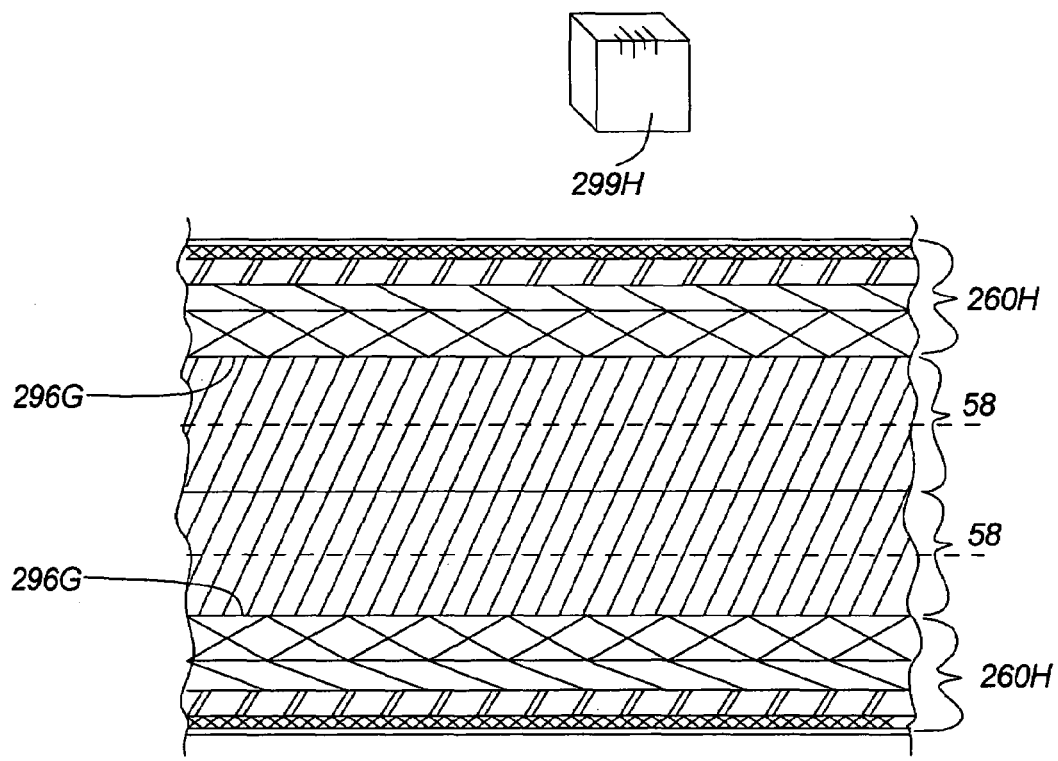
FIG. 2H illustrates another step in the manufacturing of the storage disk in FIG. 2F.

Next, layers of material are added to both of the exposed body sides 296F, as illustrated in FIG. 2H. These layers of material can be similar to those included in the first side region 60 previously described, to form a first side region 260H on each exposed body side 296H. The method of adding these layers of material can be by sputter deposition or electroplate deposition, as examples. A layering device 299H is utilized to add the layers of material to the exposed body sides 296G.

Figure 2I:
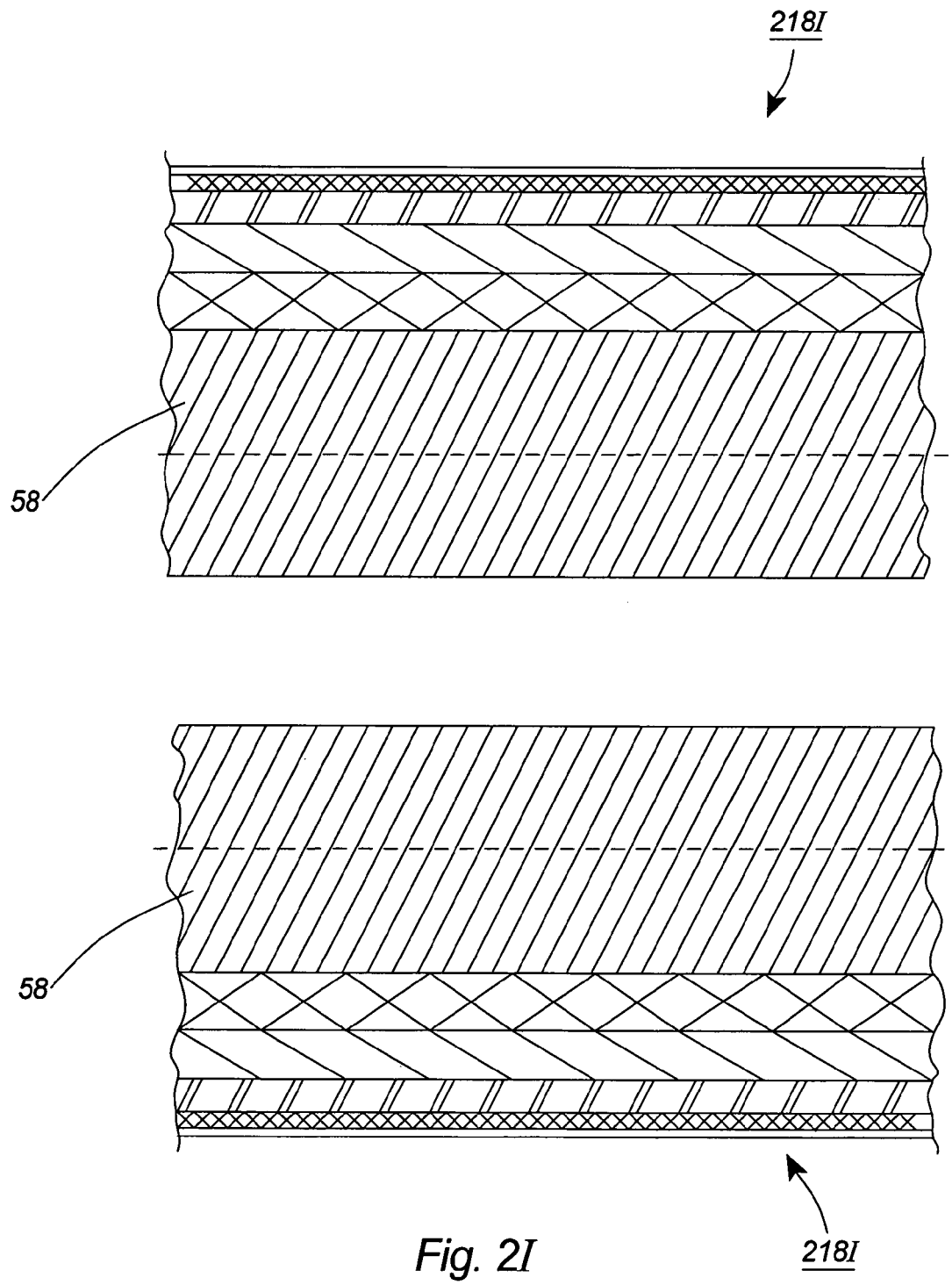
FIG. 2I illustrates another step in the manufacturing of the storage disk in FIG. 2F.

The body regions 58 are then separated, each retaining the added layers of material. FIG. 2I illustrates the two asymmetric storage disks 218I that are formed by separating the body regions 58.

Figure 3A:
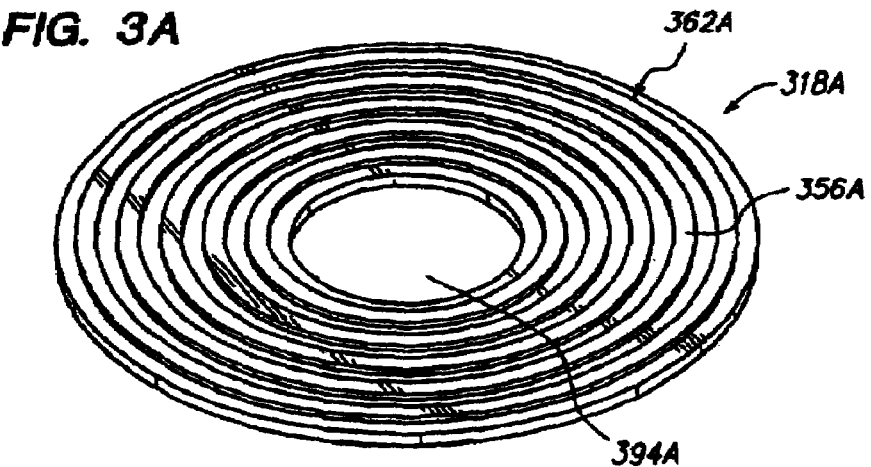
FIG. 3A is a perspective view of another embodiment of a storage disk having features of the present invention.

FIG. 3A illustrates a perspective view of another embodiment of an asymmetrical storage disk 318A. In this embodiment, the second side region 362A includes a plurality of spaced apart, substantially concentric, tubular shaped stiffeners 356A, each having a different radii. In this embodiment, the stiffeners 356A are centered about a rotational axis 394A of the storage disk 318A. Although FIG. 3A illustrates that the second side region 362A includes five concentric stiffeners 356A, any number of concentric stiffeners 356A can be used.

Figure 3B:
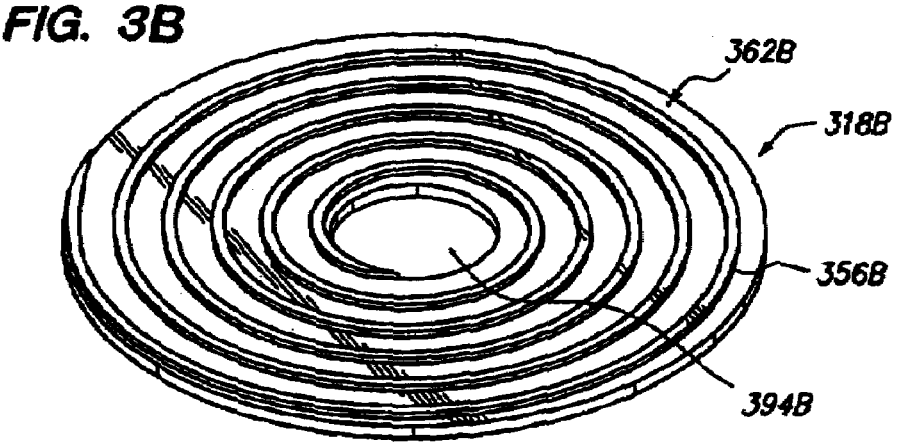
FIG. 3B is a perspective view of yet another embodiment of a storage disk having features of the present invention.

FIG. 3B illustrates a perspective view of still another embodiment of an asymmetrical storage disk 318B. In this embodiment, the second side region 362B including a spiral shaped stiffener 356B that extends from the inner diameter to the outer diameter of the storage disk 318B. The stiffener 356B can be centered about the rotational axis 394B of the storage disk 318B.

Figure 3C:
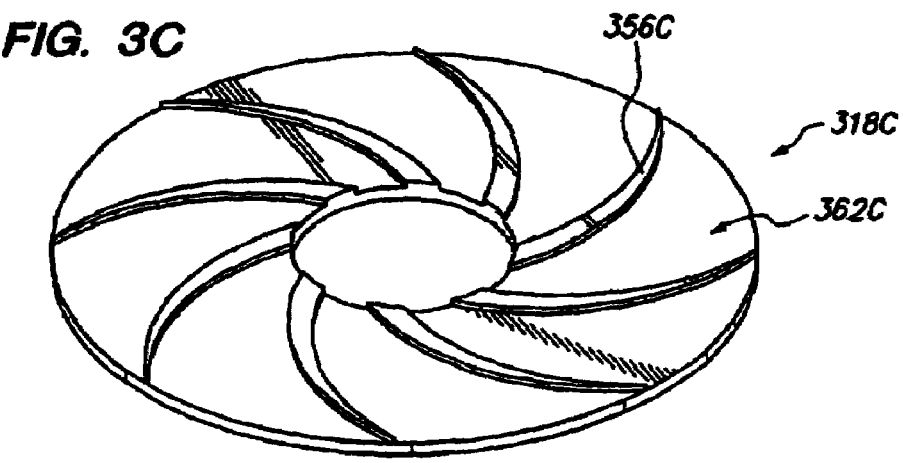
FIG. 3C is a perspective view of still another embodiment of a storage disk having features of the present invention.

FIG. 3C illustrates a perspective view of yet another embodiment of an asymmetrical storage disk 318C. In this embodiment, the second side region 362C including a plurality of spaced apart, substantially arc-shaped stiffeners 356C that extend from the inner diameter towards the outer diameter. Although FIG. 3C illustrates that the second side region 362C includes eight stiffeners 356C, any number of stiffeners 356C can be used.

In FIG. 3C, each stiffener 356C is tapered in width from the inner diameter to the outer diameter of the storage disk 318C. With this design, the stiffeners 356C not only decrease imbalance and augment rigidity to the storage disk 318C as provided previously, the stiffeners 356C can also regulate the flow of fluid generated by the rotating storage disk 318C. Depending upon the direction of rotation, i.e. clockwise or counterclockwise, turbulent fluid flow can be better directed within the drive housing (not shown in FIG. 3C) than with the substantially flat second side surface of a prior art storage disk that offers essentially no airflow guidance. With this design, the fluid within the disk drive can be moved in a manner that is advantageous to the functioning of the drive components. More specifically, the configuration and number of the stiffeners 356C can be tailored to be consistent with the design characteristics of the disk drive 10. For example, fluid flow can be steered away from more sensitive drive components such as the read/write head (not shown in FIG. 3C), for example, directed to other drive components for cooling or filtering purposes, or for other reasons beneficial to operation of the disk drive 10.

Figure 4A:
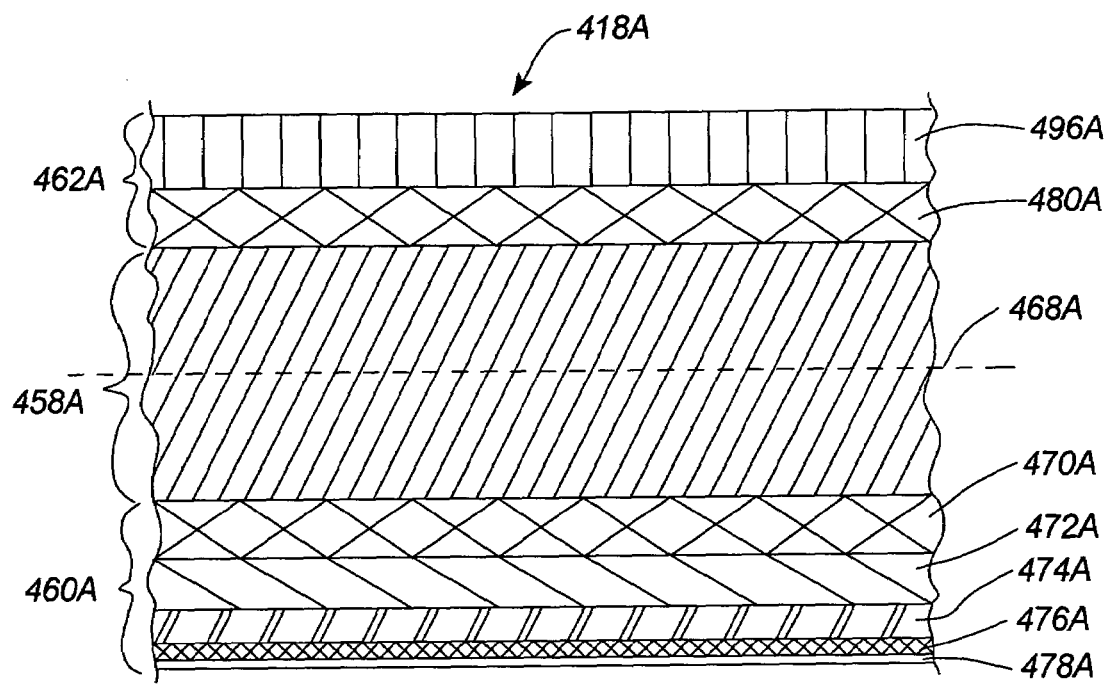
FIG. 4A is a partial cross-sectional view of a portion of another embodiment of a storage disk having features of the present invention.

FIG. 4A illustrates a cross-sectional view of another embodiment of an asymmetric storage disk 418A. In this embodiment, the storage disk 418A includes the body region 458A bisected by the central disk plane 468A, the first side region 460A and the second side region 462A. The body region 458A and the first side region 460A are somewhat similar to the corresponding components described above. The first side region 460A includes a first sublayer 470A, a first underlayer 472A, a first magnetic layer 474A, a first overcoat layer 476A and a first lubricating layer 478A that are sequentially plated or sputter deposited onto the body region 458A.

However, in this embodiment, the second side region 462 includes a second sublayer 480A and a damping layer 496A. The second sublayer 480A, for example, can be an adhesive that bonds the damping layer 496A to the body region 458A, although the presence of the second sublayer 480A in this embodiment is not required.

The damping layer 496A dampens or reduces the amplitude of vibration of the storage disk 418 during rotation. The damping layer 496A can be a coating of viscoelastic material, a self-adhesive viscoelastic film material, or other suitable damping material compositions that result in a decreased amplitude of vibration of the storage disk 418A. The thickness of the damping layer 496A can be varied. For example, the damping layer 496A can be any thickness that does not significantly interfere with rotation of the storage disk 418A. Further, the thickness of the damping layer 496A can vary over the topography of the second side region 462A. For example, the storage disk 418A may require that a thicker damping layer 496A be added in one area of the second side region 462A than in another area of the second side region 462A to provide greater rotational balance of the storage disk 418A. The average thickness of the damping layer 496A can be less than two millimeters. Alternately, for example, the average thickness can be between approximately 0.001 millimeters and 1.0 millimeters.

It should be noted that the second side region 462A does not include the same number of layers as the first side region 460A. As a result thereof, the second side region 462A can have a thickness, a mass, a density, and/or a material composition that is different than the first side region 460A. Further, the second side region 462A does not include a magnetic layer. Moreover, at least one of the second layers that is equidistant from the body region 458A as one of the first layers has a different material composition, density, mass and/or thickness.

Figure 4B:
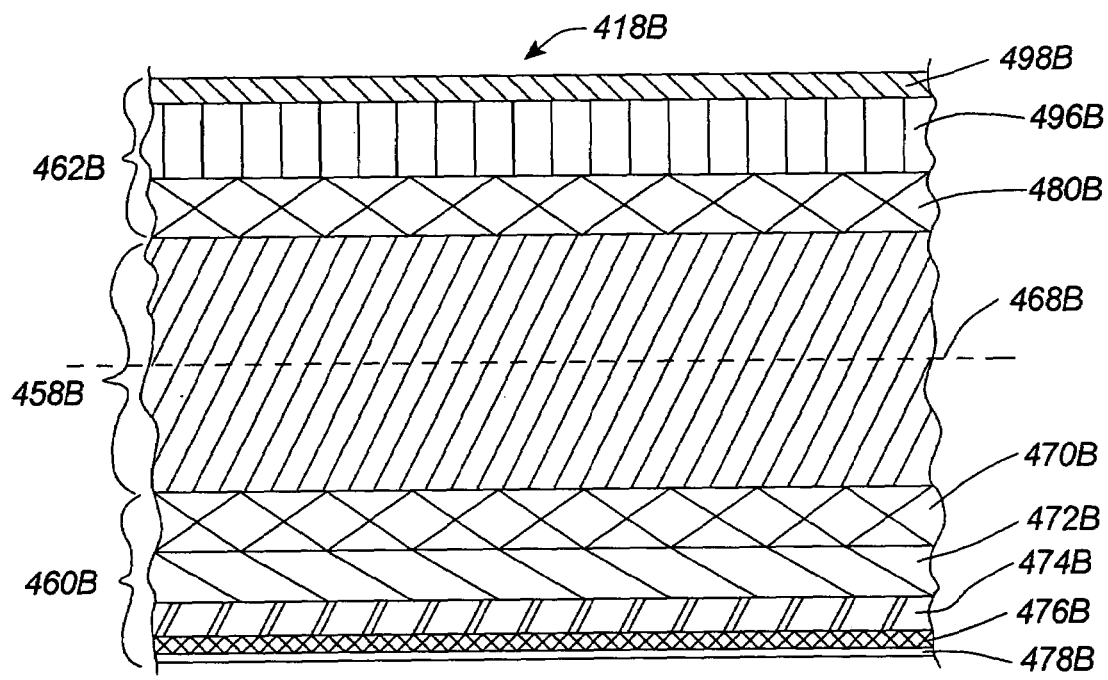
FIG. 4B is a partial cross-sectional view of a portion of still another embodiment of a storage disk having features of the present invention.

FIG. 4B illustrates still another embodiment of the storage disk 418B having asymmetric properties. In this embodiment, the storage disk 418B includes the body region 458B bisected by the central disk plane 468B, the first side region 460B and the second side region 462B. The first side region 460B can again include the first sublayer 470B, the first underlayer 472B, the magnetic layer 474B, the first overcoat layer 476B and the first lubricating layer 478B that are similar to the equivalent layers described above.

The second side region 462B includes the second sublayer 480B, the damping layer 496B and a constraining layer 498B on top of the damping layer 496B so that the damping layer 496B is positioned between the constraining layer 498B and the body region 458B. The constraining layer 498B enhances the damping properties of the damping layer 496B. The constraining layer 498B promotes the ability of the damping layer 496B to dissipate vibration of the storage disk 418B during rotation. In addition, the constraining layer 498B can provide increased rigidity of the storage disk 418B. The constraining layer 498B can be formed from various materials, such as aluminum alloys or other metals, glass, ceramic or plastic. The thickness of the constraining layer 498B can vary to suit the needs of the disk drive. For example, the constraining layer 498B can be any thickness that does not interfere with rotation of the storage disk 418B. Preferably, the thickness of the constraining layer 498B can be between 0.0001 millimeters and 1.0 millimeter.

Figure 5A:
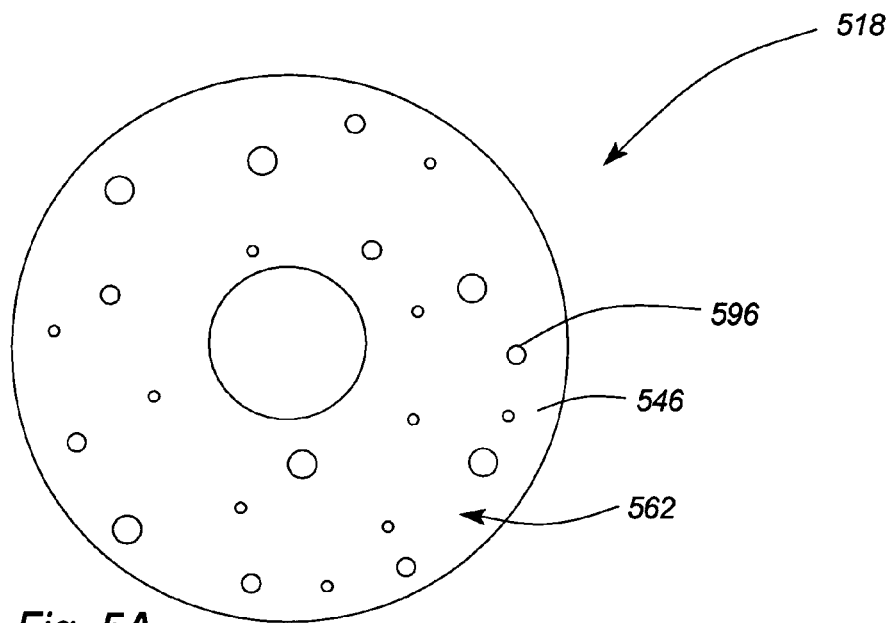
FIG. 5A is a top view of another embodiment of a storage disk having features of the present invention.

FIG. 5A illustrates another embodiment of the asymmetric storage disk 518. In this embodiment, the second side region 562 of the storage disk 518 includes a plurality of projections 596 on the second side surface 546. The projections 596 can serve to direct or disrupt airflow within the disk drive 10. FIG. 5A provides one example of a random arrangement of projections 596 disposed onto the second side region 562 of the storage disk 518. Alternately, the projections 596 can be arranged in a specific pattern that is designed to minimize excessive vibration of the storage disk 518 due to air turbulence.

Figure 5B:
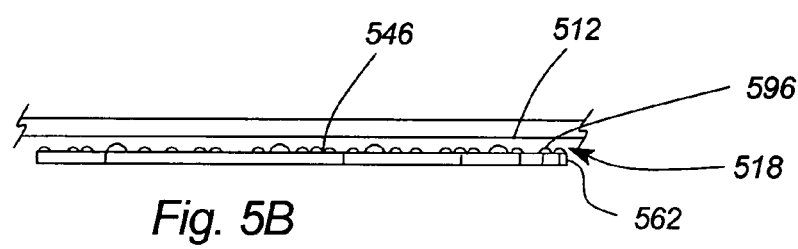
FIG. 5B is a side view of the storage disk in FIG. 5A and a portion of a drive housing.

FIG. 5B illustrates a side view of the storage disk 518 in FIG. 5A, including a portion of the drive housing 512 immediately adjacent to the second side region 562. In this embodiment, the projections 596 disrupt the cyclical movement of air between the second side surface 546 and the drive housing 512. The pattern, shape and size of the projections 596 can be varied according to the design requirements of the disk drive 10, or to account for any imbalance that may have been identified during the testing portion of the manufacturing process. Further, the height of each projection 596 can vary from projection to projection. For example, the projections 596 can have a height that is between approximately 0.0001 millimeters and 0.5 millimeters above the rest of the second side surface 546, although the projections 596 can be less than 0.001 millimeters in height. The projections 596 can be formed by plating, by sputter deposition or by other appropriate methods.

Figure 6:
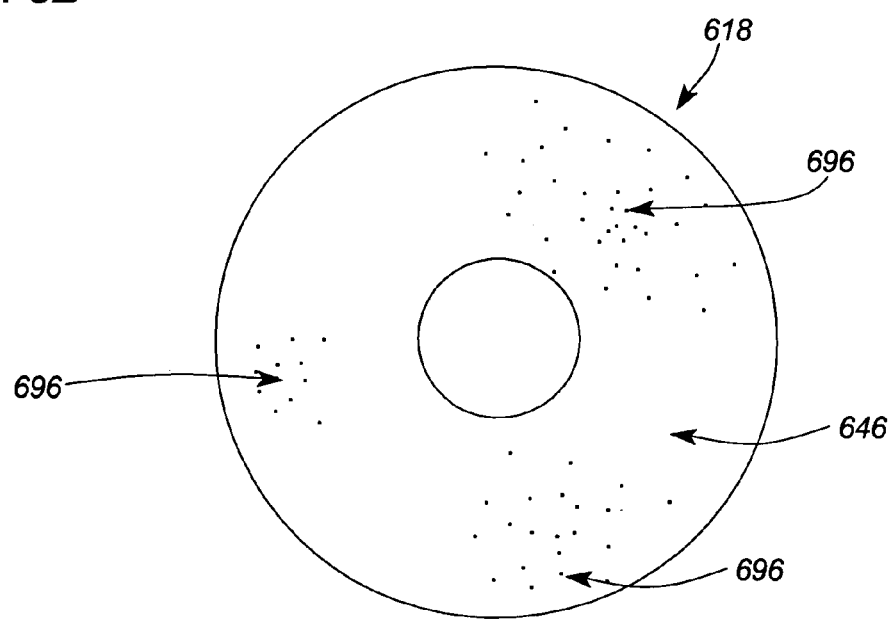
FIG. 6 is a top view of yet another embodiment of a storage disk having features of the present invention.

FIG. 6 illustrates another embodiment of the asymmetric storage disk 618. In this embodiment, the storage disk 618 includes a supplemental layer 696 (shown as dots) that is added to at least a portion of the second side surface 646. Because the second side surface 646 is not adapted to store data, the second disk surface 618 can be modified during production. For example, if the storage disk 618 is determined to be out of balance based on testing performed during the manufacturing process, i.e. a portion of the storage disk 618 has disproportionately less mass than another portion of the storage disk 618, the supplemental layer 696 can be added to the second side surface 646 to improve the balance of the storage disk 618.

The composition of the supplemental layer 696 can vary to suit the design requirements of the disk drive 10. The supplemental layer 696 can be one of the same materials used in formation of another layer of the storage disk 618, in order to simplify the manufacturing process and decrease production costs. For example, a nickel alloy or an aluminum alloy used in other layers of the storage disk 618 can be added to the second side surface 646 by a plating process, by a sputter-deposit method, or by any other suitable method recognized in the art. Alternatively, any other suitable material can be used for the supplemental layer 696. The thickness of the supplemental layer 696 can vary depending upon the level of imbalance found during testing. The supplemental layer 696 can be thicker in some areas of the second side surface 646, and can feather out and dissipate so that other areas of the second side surface 646 are devoid of the supplemental layer 646, as shown in undotted portions of FIG. 6.

Figure 7A:
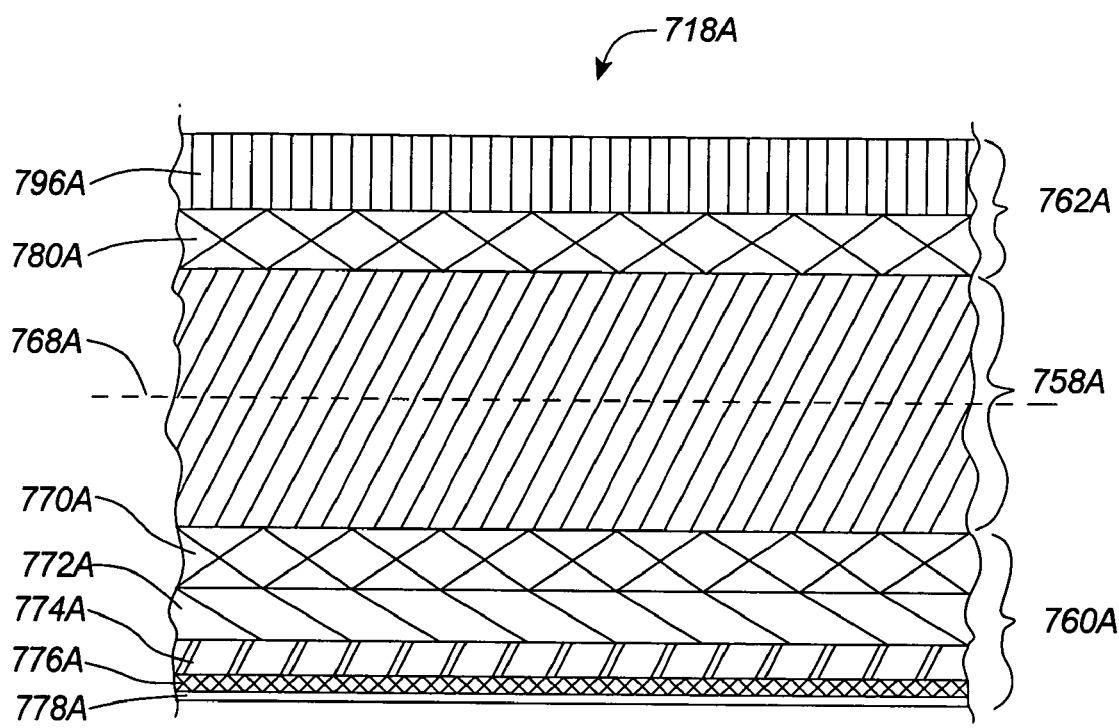
FIG. 7A is a partial cross-sectional view of another embodiment of a portion of a storage disk having features of the present invention.

FIG. 7A illustrates a cross-sectional view of another embodiment of an asymmetrical storage disk 718A. In this embodiment, the storage disk 718 includes the body region 758A that is bisected by the central disk plane 768A, the first side region 760A and the second side region 762A. The first side region 760A can include the first sublayer 770A, the first underlayer 772A, the first magnetic layer 774A, the first overcoat layer 776A and the first lubricating layer 778A.

The second side region 762A includes the second sublayer 780A, and an adsorption layer 796A that adsorbs organic and/or inorganic impurities (not shown) from the interior of the disk drive. The adsorption layer 796A can be comprised of a chemical adsorbent that is capable of filtering outgases (not shown) and other vapors generated during the life span of the disk drive. The adsorption layer 796A can be porous and sized to allow air or other fluids within the disk drive to flow around the chemical adsorbent, allowing the chemical adsorbent to filter the desired chemicals by absorption and/or adsorption. The adsorption layer 796A can be adhesively applied to the any of the layers of the second side region 762A of the storage disk 718, or can be secured by any other suitable method. The adsorption layer 796A can be the outermost layer on the second side region 762A of the storage disk 718, as illustrated in FIG. 7A. The absorption layer 796A can have a thickness of between approximately 0.005 millimeters and 0.1 millimeters, for example.

Figure 7B:
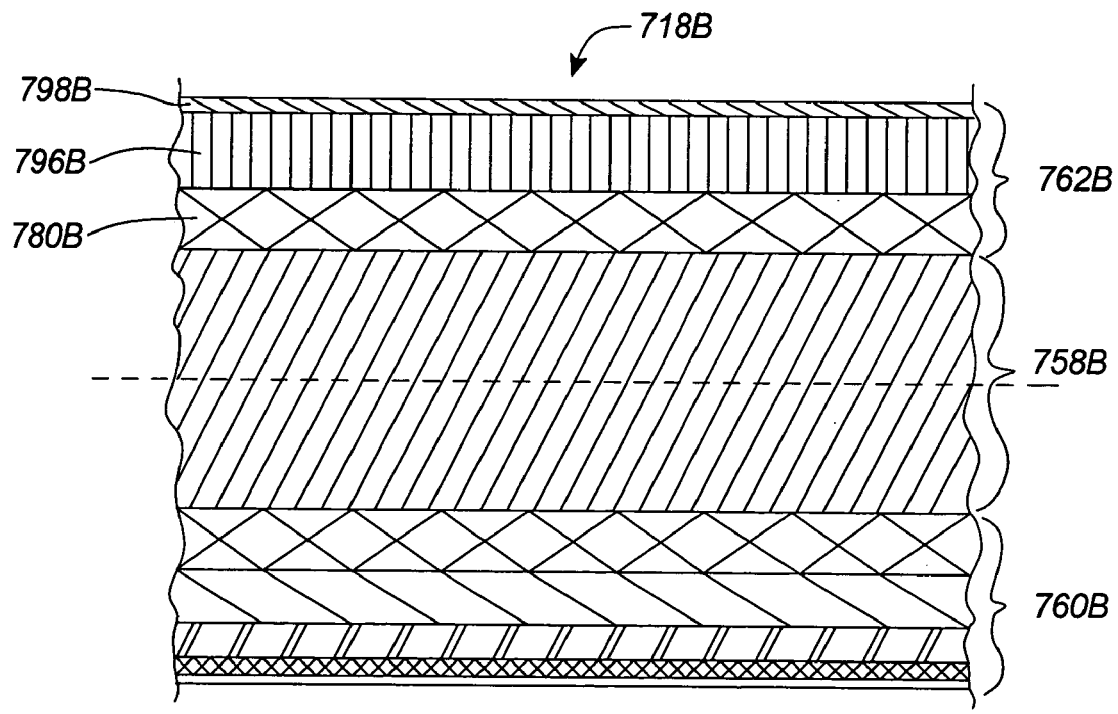
FIG. 7B is a partial cross-sectional view of a portion of still another embodiment of a storage disk having features of the present invention.

FIG. 7B illustrates yet another embodiment of the asymmetric storage disk 718B, including the body region 758B, the first side region 760B and the second side region 762B. The first side region 760B can be formed similar to that shown in FIG. 7A, for example. The second side region 762B can include the second sublayer 780B, the absorption layer 796B, and a diffusion layer 798B that covers the adsorption layer 796B. The diffusion layer 798B filters out dust, debris, volatiles and other particles (not shown) within the disk, drive. The diffusion layer 798B can be removably secured to the adsorption layer 796B so that the chemical adsorbent of the adsorption layer 796B can be replaced if necessary. Alternate ways to secure the diffusion layer 798B can also be utilized provided operation of the disk drive is not compromised. The diffusion layer 798B can be constructed from a variety of known and available materials for disk drive applications, including electrostatic media and/or membrane. Moreover, the second side region 762B can exclude the adsorption layer 798B, with the diffusion layer 796B being adhered to any of the other layers of the second side region 762B of the storage disk 718, for example. The diffusion layer 796B can have a thickness of between approximately 0.05 mm and 0.1 mm.

In addition to the embodiments set forth above, various other embodiments of the present invention are contemplated which have asymmetric properties relative to the body region and/or the central disk plane. Moreover, the second side region can be utilized for other purposes that serve to enhance operation of the disk drive other than those provided herein.

To any feasible extent, the mass of the second side region can be greater or less than the mass of the first side region. For example, the mass of the second side region can differ from the mass of the first side region by at least approximately 1.0 percent. In another embodiment, the mass of the second side region can differ from the mass of the first side region by at least approximately 0.01 percent. In still another embodiment, the mass of the second side region can differ from the mass of the first side region by at least approximately 0.0001 percent.

Additionally, the density of the second side region can be greater or less than the density of the first side region. For instance, the density of the second side region can differ from the density of the first side region by at least approximately 1.0 percent. In another embodiment, the density of the second side region can differ from the density of the first side region by at least approximately 0.01 percent. In yet another embodiment, the density of the second side region can differ from the density of the first side region by at least approximately 0.0001 percent.

The thickness of the second side region can likewise vary from the thickness of the first side region. In one embodiment of the storage disk, the thickness of the second side region can differ from the thickness of the first side region by at least approximately 0.1 percent. In another embodiment, the thickness of the second side region can differ from the thickness of the first side region by at least approximately 0.001 percent. In a further embodiment, the thickness of the second side region can differ from the thickness of the first side region by at least approximately 0.00001 percent.

Further, although the storage disks described herein are particularly suited to one-head disk drives 10, the storage disks can also be incorporated into multiple head disk drives. For example, a disk drive 10 with multiple storage disks can utilize one or more asymmetrical storage disks in accordance with the teachings provided herein. The remaining storage disks can be conventional storage disks having two data storage surfaces that can each interact with a corresponding read/write head.

While the particular storage disks and disk drive 10 as herein shown and disclosed in detail, are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A hard disk drive comprising:
a drive housing; and
an asymmetrical storage disk that is rotatably coupled to the drive housing, the storage disk including a substantially rigid body region, a first side region that stores data in one or more data tracks and a second side region opposite the first side region, the body region being positioned between the side regions, the second side region including an exposed outer flat section and a raised stiffener that increases the rigidity of the storage disk, the stiffener being at least partially positioned directly opposite one of the data tracks and extending at least approximately 0.001 millimeters away from the outer flat section.

2. The disk drive of claim 1 wherein the stiffener is at least partially exposed.

3. The disk drive of claim 1 wherein the stiffener is shaped so that a portion of the stiffener is non-parallel to the outer flat section.

4. The disk drive of claim 1 wherein the stiffener is shaped so that a portion of the stiffener is substantially perpendicular to the outer flat section.

5. The disk drive of claim 1 wherein the stiffener is configured to guide the flow of fluid within the drive housing.

6. The disk drive of claim 1 further comprising a read/write head, wherein the stiffener is configured to guide the flow of fluid at least partially away from the read/write head.

7. The disk drive of claim 1 wherein the second side region has an exposed second side surface that includes the outer flat section and an outer ridged section, the outer ridged section extending at least approximately 0.001 millimeters away from the outer flat section.

8. The disk drive of claim 7 wherein the outer ridged section extends less than approximately 2.0 millimeters away from the outer flat section.

9. The disk drive of claim 1 wherein the storage disk has an inner diameter and an outer diameter, and wherein a width of the stiffener increases along a direction from the inner diameter toward the outer diameter.

10. The disk drive of claim 1 wherein the storage disk has an inner diameter and an outer diameter, and wherein a width of the stiffener decreases along a direction from the inner diameter toward the outer diameter.

11. The disk drive of claim 1 wherein the storage disk has an inner diameter and an outer diameter, and wherein a width of the stiffener is substantially uniform along a direction from the inner diameter toward the outer diameter.

12. The disk drive of claim 1 wherein the storage disk has an inner diameter and an outer diameter, and wherein the stiffener is arc-shaped in a direction moving from the inner diameter to the outer diameter.

13. The disk drive of claim 1 wherein the storage disk includes a plurality of raised stiffeners, wherein a height of each of at least two of the stiffeners differs from one another.

14. The disk drive of claim 1 wherein the first side region has a mass that is different than a mass of the second side region.

15. The disk drive of claim 1 wherein the first side region has a thickness that is different than a thickness of the second side region.

16. The disk drive of claim 1 wherein the first side region has a density that is different than a density of the second side region.

17. The disk drive of claim 1 wherein the first side region is substantially planar.

18. A hard disk drive comprising:
a drive housing; and
an asymmetrical storage disk that is rotatably coupled to the drive housing, the storage disk including a substantially rigid body region, a first side region that stores data in one or more data tracks and a second side region opposite the first side region, the body region being positioned between the side regions, the second side region having an exposed second side surface including an outer flat section and an outer ridged section that is least partially positioned directly opposite one of the data tracks and that extends at least approximately 0.001 millimeters above the outer flat section.

19. The disk drive of claim 18 wherein the outer flat section is substantially planar.

20. The disk drive of claim 18 wherein the storage disk has an inner diameter and an outer diameter, and the storage disk includes a stiffener that increases the rigidity of the storage disk, the stiffener being at least partially exposed.

21. The disk drive of claim 20 wherein the stiffener is configured so that a portion of the second side surface is substantially perpendicular to the outer flat section.

22. The disk drive of claim 20 wherein the stiffener is configured to guide the flow of fluid within the drive housing.

23. The disk drive of claim 20 wherein the stiffener extends at least approximately 0.001 millimeters above the outer flat section.

24. The disk drive of claim 20 wherein a width of the stiffener increases along a direction from the inner diameter toward the outer diameter.

25. The disk drive of claim 20 wherein a width of the stiffener decreases along a direction from the inner diameter toward the outer diameter.

26. The disk drive of claim 20 wherein a width of the stiffener is substantially uniform along a direction from the inner diameter toward the outer diameter.

27. The disk drive of claim 20 wherein the stiffener is arc-shaped in a direction moving from the inner diameter to the outer diameter.

28. The disk drive of claim 20 wherein the storage disk includes a plurality of raised stiffeners, wherein a height of each of at least two of the stiffeners differs from one another.

29. The disk drive of claim 18 wherein the outer ridged section extends less than approximately 2.0 millimeters away from the outer flat section.

30. The disk drive of claim 18 wherein the first side region has a mass that is different than a mass of the second side region.

31. The disk drive of claim 18 wherein the first side region has a thickness that is different than a thickness of the second side region.

32. The disk drive of claim 18 wherein the first side region has a density that is different than a density of the second side region.

33. The disk drive of claim 18 wherein the first side region has a substantially planar first side surface, and wherein the outer flat section is substantially parallel to the first side surface.

34. A method for manufacturing a hard disk drive, the method comprising the step of:
rotatably coupling a storage disk to a drive housing, the storage disk having a substantially rigid body region, a first side region that stores data in one or more data tracks and a second side region opposite the first side region, the body region being positioned between the side regions, the second side region including an exposed outer flat section and a raised stiffener that increases the rigidity of the storage disk, the stiffener being least partially positioned directly opposite one of the data tracks and extending at least approximately 0.001 millimeters away from the outer flat section.

35. The method of claim 34 wherein the step of rotatably coupling includes shaping the stiffener so that a portion of the stiffener is non-parallel to the outer flat section.

36. The method of claim 34 wherein the step of rotatably coupling includes shaping the stiffener so that a portion of the stiffener is perpendicular to the outer flat section.

37. The method of claim 34 wherein the step of rotatably coupling includes shaping the stiffener so that a width of the stiffener changes along a direction from an inner diameter toward an outer diameter of the storage disk.

38. The method of claim 34 wherein the step of rotatably coupling includes shaping the stiffener so that a width of the stiffener is substantially uniform along a direction from an inner diameter toward an outer diameter of the storage disk.

39. The method of claim 34 wherein the step of rotatably coupling includes shaping the stiffener so that the stiffener is arc-shaped in a direction moving from an inner diameter toward an outer diameter of the storage disk.

40. The method of claim 34 wherein the step of rotatably coupling includes forming the first side region to have a mass that is different than a mass of the second side region.

41. The method of claim 34 wherein the step of rotatably coupling includes forming the first side region to have a thickness that is different than a thickness of the second side region.

42. The method of claim 34 wherein the step of rotatably coupling includes forming the first side region to have a density that is different than a density of the second side region.

43. A method for manufacturing a hard disk drive, the method comprising the step of:
rotatably coupling a storage disk to a drive housing, the storage disk having a substantially rigid body region, a first side region that stores data in one or more data tracks and a second side region opposite the first side region, the body region being positioned between the side regions, the second side region having an exposed second side surface including an outer flat section and an outer ridged section that is least partially positioned directly opposite one of the data tracks and that extends at least approximately 0.001 millimeters above the outer flat section.

44. The method of claim 43 wherein the step of rotatably coupling includes increasing the rigidity of the storage disk with a stiffener that raises the outer ridged section above the outer flat section.

45. The method of claim 44 wherein the step of rotatably coupling includes shaping the stiffener so that a width of the stiffener changes along a direction from an inner diameter toward an outer diameter of the storage disk.

46. The method of claim 44 wherein the step of rotatably coupling includes shaping the stiffener so that a width of the stiffener is substantially uniform along a direction from an inner diameter toward an outer diameter of the storage disk.

47. The method of claim 44 wherein the step of rotatably coupling includes shaping the stiffener so that the stiffener is arc-shaped in a direction moving from an inner diameter toward an outer diameter of the storage disk.

48. The method of claim 44 wherein the step of rotatably coupling includes forming the first side region to have a mass that is different than a mass of the second side region.

49. The method of claim 44 wherein the step of rotatably coupling includes forming the first side region to have a thickness that is different than a thickness of the second side region.

50. The method of claim 44 wherein the step of rotatably coupling includes forming the first side region to have a density that is different than a density of the second side region.

51. A disk drive comprising:
a drive housing; and
an asymmetrical storage disk that is rotatably coupled to the drive housing, the storage disk including a body region, a first side region that stores data, a second side region opposite the first side region, and a stiffener that increases the rigidity of the storage disk and guides the flow of fluid within the drive housing, the body region being positioned between the side regions, the second side region having an exposed second side surface including an outer flat section and an outer ridged section that extends at least approximately 0.001 millimeters above the outer flat section.

52. A disk drive comprising:
a drive housing; and
an asymmetrical storage disk that is rotatably coupled to the drive housing, the storage disk including a body region, a first side region that stores data, a second side region opposite the first side region, and a stiffener that increases the rigidity of the storage disk, the stiffener having a width that changes along a direction generally from the inner diameter to the outer diameter, the body region being positioned between the side regions, the second side region having an exposed second side surface including an outer flat section and an outer ridged section that extends at least approximately 0.001 millimeters above the outer flat section.

53. A disk drive comprising:
a drive housing; and
an asymmetrical storage disk that is rotatably coupled to the drive housing, the storage disk having an inner diameter and an outer diameter, the storage disk including a body region, a first side region that stores data, a second side region opposite the first side region, and an arc-shaped stiffener in a direction moving from the inner diameter to the outer diameter, the stiffener increasing the rigidity of the storage disk, the body region being positioned between the side regions, the second side region having an exposed second side surface including an outer flat section and an outer ridged section that extends at least approximately 0.001 millimeters above the outer flat section.

54. A disk drive comprising:
a drive housing; and
an asymmetrical storage disk that is rotatably coupled to the drive housing, the storage disk including a body region, a first side region that stores data, a second side region opposite the first side region, and a plurality of raised stiffeners that increase the rigidity of the storage disk, at least two of the stiffeners having heights that differ from one another, the body region being positioned between the side regions, the second side region having an exposed second side surface including an outer flat section and an outer ridged section that extends at least approximately 0.001 millimeters above the outer flat section.

55. A method for manufacturing a disk drive, the method comprising the step of:
rotatably coupling a storage disk to a drive housing, the storage disk having a body region, a first side region that stores data and a second side region opposite the first side region, the body region being positioned between the side regions, the second side region having an exposed second side surface including an outer flat section and stiffener that extends at least approximately 0.001 millimeters above the outer flat section, the stiffener increasing the rigidity of the storage disk, the stiffener having a width that is measured substantially parallel to the outer flat section, the width being non-uniform.

56. A hard disk drive comprising:
a drive housing; and
an asymmetrical storage disk that is rotatably coupled to the drive housing, the storage disk having an inner diameter and an outer diameter, the storage disk including a substantially rigid body region, a first side region that stores data and a second side region opposite the first side region, the body region being positioned between the side regions, the second side region including an exposed outer flat section and a raised stiffener that increases the rigidity of the storage disk, the stiffener being arc-shaped in a direction moving from the inner diameter to the outer diameter and extending at least approximately 0.001 millimeters away from the outer flat section.

57. A hard disk drive comprising:
a drive housing; and
an asymmetrical storage disk that is rotatably coupled to the drive housing, the storage disk including a substantially rigid body region, a first side region that stores data and a second side region opposite the first side region, the body region being positioned between the side regions, the second side region including an exposed outer flat section and a plurality of raised stiffeners, at least one of the stiffeners increasing the rigidity of the storage disk, one of the stiffeners extending at least approximately 0.001 millimeters away from the outer flat section, wherein a height of each of at least two of the stiffeners differs from one another.

58. A method for manufacturing a hard disk drive, the method comprising the step of:
rotatably coupling a storage disk to a drive housing, the storage disk having a substantially rigid body region, a first side region that stores data and a second side region opposite the first side region, the body region being positioned between the side regions, the second side region including an exposed outer flat section and a raised stiffener that increases the rigidity of the storage disk, the stiffener being arc-shaped in a direction moving from an inner diameter toward an outer diameter of the storage disk and extending at least approximately 0.001 millimeters away from the outer flat section.

\* \* \* \* \*